April 29, 1947.           A. V. BEDFORD           2,419,812
SERVO MECHANISM CIRCUIT
Filed March 31, 1943
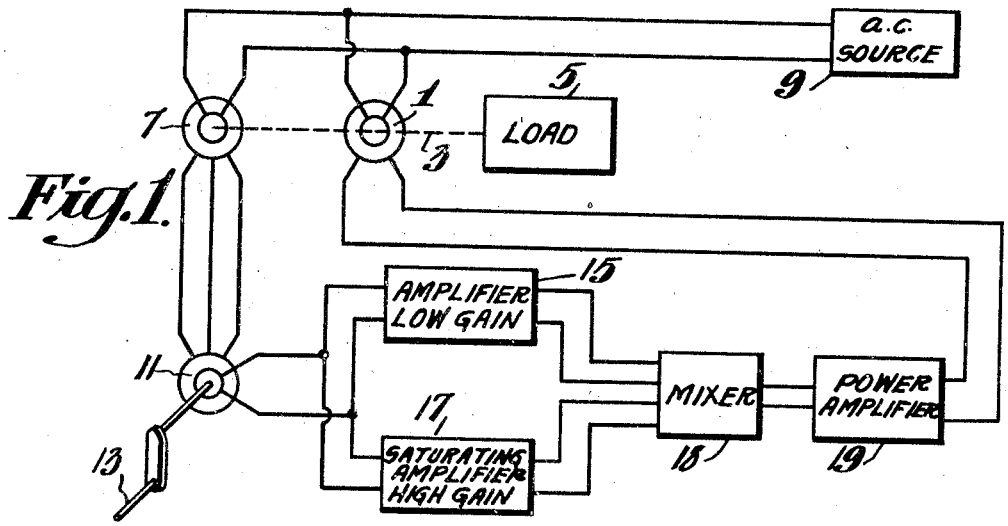
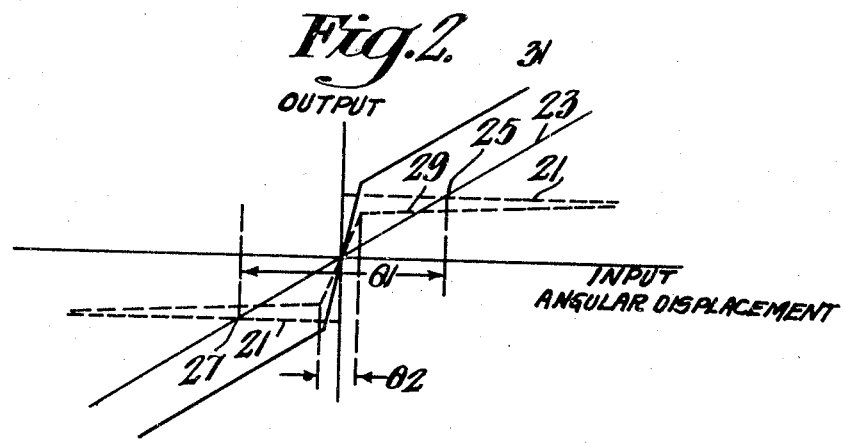
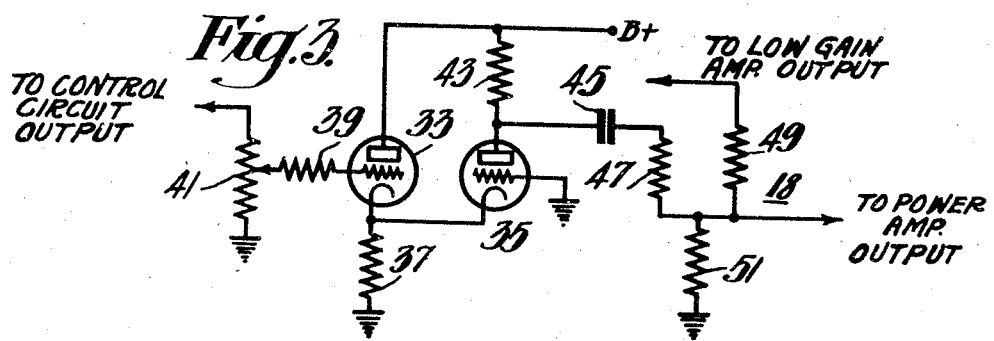
Inventor
Alda V. Bedford
By
C. D. Tuska
Attorney Patented Apr. 29, 1947

2,419,812

UNITED STATES PATENT OFFICE 2,419,812

SERVO MECHANISM CIRCUITS

Alda V. Bedford, Princeton, N. J., assignor to Radio Corporation of America, a corporation of Delaware Application March 31, 1943, Serial No. 481,256

2 Claims. (Cl. 172—239)

This invention relates to servo systems and more particularly to the compensation of the effects of friction upon the accuracy of performance of electrical servo systems or follow-up systems.

An electrical servo system generally comprises an electric motor, a source of control signals and means for controlling the motor in response to control signals to drive a load device to an angular position related in some predetermined manner to the control signal. The magnitude or effect of the control signal is reduced as the load device approaches the correct angular position so that the signal becomes zero, deenergizing the motor when the final position of the load device is attained. Owing to friction, inertia and time delay, various errors are introduced in the performance of such servo systems. For example, excessive friction will cause the driving motor to stall before the control signal has decreased to zero, preventing the load from being driven all the way to the correct position. If this effect is minimized by increasing the control sensitivity so as to provide a large control signal up to the point to which the load is to be driven, the inertia of the load will cause it to continue to rotate after deenergization of the driving motor, over-running the correct position and reversing the control signal. This in turn provides a large reverse motor torque, further over-shooting of the load in the opposite direction and consequent sustained oscillation. This effect is known as "hunting."

It is the principal object of the present invention to provide an improved method and means for compensating the effects of friction and inertia in an electrical servo system. This and other objects will become apparent to those skilled in the art upon consideration of the following description with reference to the accompanying drawing of which:

Figure 1 is a schematic diagram of an electrical servo system embodying the invention, Figure 2 is a graph of control signals produced in the operation of the system in Figure 1, and Figure 3 is a schematic circuit diagram of a saturating amplifier employed in the circuit of Figure 1.

Referring to Figure 1, a reversible alternating current motor 1 is mechanically connected, as indicated schematically by the dash line 3, to a load device 5. The motor 1 is also connected to the rotor of a Selsyn transformer 7. One of the power input windings of the motor 1 is connected to an alternating current source 9. The rotor winding of the Selsyn transformer 7 is also connected to the source 9. The stator winding of the transformer 7 is connected to the stator winding of a second Selsyn transformer 11. The rotor of the transformer 11 is mechanically connected to a control input device such as a manually operable crank 13.

The rotor winding of the transformer 11 is connected to the input circuit of two amplifiers, 15 and 17. The amplifier 15 is designed to provide a relatively low constant gain over the range of input voltages provided by the transformer 11. The amplifier 17 is designed to provide a relatively high gain with low input voltages and to saturate with input voltages having greater than a predetermined amplitude. The output circuit of the amplifiers 15 and 17 are coupled to the input circuit of a power amplifier 19 through a mixer circuit, 18. The output circuit of the amplifier 19 is connected to a second power input circuit of the motor 1.

The operation of the system of Figure 1 is as follows: A.-C. voltage applied to the rotor of the transformer 7 produces a field therein in a direction corresponding to the angular position of the rotor. This induces voltages in the stator windings which are applied to the stator of the transformer 11, providing a resultant field in the transformer 11 in a direction corresponding to that of the field produced by the rotor in the transformer 7. This resultant field induces a voltage in the rotor of the transformer 11 which corresponds in magnitude to the angular difference in position between the rotors of the transformers 7 and 11. The polarity of the induced voltage depends upon which of the rotors leads the other. Thus as long as there is any difference in the angular positions of the load 5 and the crank 13, a voltage is applied to the amplifiers 15 and 17.

Neglecting for the moment the effect of the amplifier 17, the control signal is amplified by the amplifier 15 and the power amplifier 19 and applied to the motor 1. The motor 1 will rotate in a direction determined by the polarity of the control signal, rotating the load 5 and the rotor of the transformer 7 toward a position corresponding to that of the crank 13. As the transformer 7 is rotated, the field in the transformer 11 rotates correspondingly, reducing the voltage induced in the rotor. Thus the energization of the motor 1 is decreased as the load 5 approaches the position corresponding to that of the crank 13. Finally, the torque of the motor 1 is insufficient to overcome the friction of the load and the motor stops. Thus the final position of the load does not correspond exactly to that of the crank 13 but approaches it to an extent depending upon the gain of the amplifier 15.

Referring to Figure 2, the dash lines 21 represent the control signal amplitude which is required to overcome the friction of the motor 1 and the driven load 5. The solid line 23 represents the output of the amplifier 15 as a function of the angle between the rotors of the transformers 7 and 11. The lines 21 and 23 intersect at points 25 and 27, indicating that the signal applied to motor 1 is insufficient to cause rotation over the range between these points, corresponding to the angle $\theta_1$. It is apparent that this range may be decreased by increasing the slope of the line 23, which corresponds to increasing the gain of the amplifier 15. However, if this is attempted, it will be found that a limit is reached whereupon the inertia of the load will cause overshooting and hunting due to excessive motor torque during approach to the equilibrium point.

In order to provide adequate control sensitivity without simultaneously introducing a tendency to hunt, the amplifier 17 is adjusted to provide high gain over a relatively narrow angle $\theta_2$, saturating beyond this point so that the relation between input and output is as indicated by the dotted line 29 in Figure 2. The outputs of the two amplifiers 15 and 17 are added in the input circuit of the amplifier 19, producing an overall characteristic which is represented by the solid line 31, Figure 2. The output of the amplifier 17 is a very close approximation to the signal required to just balance the frictional component of the mechanical load beyond the limits of the range $\theta_2$. Thus without increasing the control sensitivity of the system over that provided by the amplifier 15, the range over which the control input may be varied without causing rotation of the driving motor is decreased very materially, providing increased accuracy of response.

Referring to Figure 3, a suitable circuit for the saturating amplifier 17 is illustrated. A pair of triode tubes 33 and 35 are provided with a common cathode resistance 37. The control grid of the tube 33 is connected through a resistor 39 to a voltage divider 41. The anode of the tube 33 is connected directly to a direct current source (not shown) of anode potential. The anode of the tube 35 is connected to the source through a load resistor 43. The anode of the tube 35 is coupled through a blocking capacitor 45 to the mixer circuit 18 which comprises resistors 47, 49 and 51. The resistance of the resistor 51 is a relatively small fraction of that of the resistor 47 and 49. The output of the tube 35 is applied to the resistor 51 through the resistor 47, and the output of the amplifier 15 is applied to the resistor 51 through the resistor 49. The currents through the resistors 47 and 49 are substantially proportional to the output voltages of the amplifiers 15 and 17 respectively and are substantially independent of each other. The current through the resistor 51 is the sum of the currents through the resistors 47 and 49 and is therefore proportional to the sum of the output voltages of the amplifiers 15 and 17. Thus the voltage drop across the resistor 51 is substantially directly proportional to the sum of the outputs of the amplifiers 15 and 17. This voltage is applied to the power amplifier 19.

The operation of the saturating amplifier 17 is as follows: With relatively low amplitudes of input voltage the plate current of the tube 33 varies in substantially the same manner as the input voltage, producing a voltage drop in the cathode resistor 37 which varies correspondingly. The cathode of the tube 35 being connected to the cathode of the tube 33 has similar variations impressed upon it, causing the grid-to-cathode potential in the tube 35 to vary in the same manner but in opposite polarity from that of the tube 33. This causes corresponding variations in the anode current of the tube 35, varying the drop in the load resistor 43 to produce output voltage substantially proportional to the input to the tube 33. Bias for both of the tubes 33 and 35 is provided by the D.-C. component of the voltage drop in the resistor 37. As the amplitude of the input to the tube 33 is increased beyond a predetermined point, the control grid of the tube 33 is substantially cut off during negative swings of the input signal, limiting the amplitude of the variations produced across the resistor 37 and hence that of the output voltage. During positive swings of the input signal, the tube 35 is cut off, similarly limiting the output amplitude.

Although the invention has been described in connection with a specific type of electrical servo system with mechanical input in a particular type of saturating amplifier arrangement, it should be apparent to those skilled in the art that the principle described above is subject to numerous modifications and may be applied to various servo systems. For example, the control signal may be derived from any source which provides alternating current of the reversible polarity rather than the cascaded Selsyn transformers illustrated in the embodiment of Figure 1. The driving motor may be a commutator type A.-C. motor, a polyphase induction motor or a reversible D.-C. motor of any known type. The saturating amplifier may comprise any circuit which provides an input-output of the type illustrated in Figure 2. Although A.-C. signals are used in the servo system herein described, the invention may be incorporated in a system employing D.-C. signals or variable phase rather than variable amplitude A.-C. signals.

I claim as my invention:

1. A motor control system including a source of control energy, an electric motor, an amplifier connected between said source and said motor, and a second amplifier with its input and output circuits coupled to the input and output circuits respectively of said first amplifier, said first amplifier having a relatively large power output capability and relatively low gain and said second amplifier having relatively high gain and relatively low maximum power output capability, said second amplifier being arranged to saturate at a predetermined input level.

2. A motor control system including a source of control energy, an electric motor, an amplifier having a relatively large maximum output capability and relatively low gain, a second amplifier having a relatively high gain and relatively low maximum output capability and being arranged to saturate at a predetermined input level, means for applying said control energy to both of said amplifiers, and means for controlling the energization of said motor in response to the sum of the outputs of said amplifiers.

ALDA V. BEDFORD.

REFERENCES CITED

The following references are of record in the file of this patent:

UNITED STATES PATENTS

| Number | Name | Date |
|---|---|---|
| 1,552,781 | Von Arco | Sept. 8, 1925 |
| 2,077,179 | Moseley | Apr. 13, 1937 |
| 1,998,938 | Mittag | Apr. 23, 1935 |
| 2,040,014 | Moseley | May 5, 1936 |
| 1,554,698 | Alexanderson | Sept. 22, 1938 |

FOREIGN PATENTS

| Number | Country | Date |
|---|---|---|
| 489,271 | England | July 22, 1938 |